(12) United States Patent
Marcus et al.

(10) Patent No.: US 9,971,560 B2
(45) Date of Patent: May 15, 2018

(54) DISPLAYING MESSAGES USING BODY-WORN ELECTRONIC DISPLAY DEVICES

(71) Applicant: MOTOROLA SOLUTIONS, INC., Schaumburg, IL (US)

(72) Inventors: Daniel R. Marcus, York (CA); Goktug Duman, Plantation, FL (US); Craig F Siddoway, Davie, FL (US); Chi T. Tran, Weston, FL (US); Bert Van Der Zaag, Golden, CO (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days. days.

(21) Appl. No.: 15/147,491

(22) Filed: May 5, 2016

(65) Prior Publication Data
US 2017/0322761 A1 Nov. 9, 2017

(51) Int. Cl.
*G06F 1/16* (2006.01)
*G06F 3/14* (2006.01)

(52) U.S. Cl.
CPC ............ *G06F 3/1438* (2013.01); *G06F 1/163* (2013.01); *G06F 1/1637* (2013.01); *G06F 1/1694* (2013.01)

(58) Field of Classification Search
None
See application file for complete search history.

(56) References Cited

U.S. PATENT DOCUMENTS 5,906,004 A 5/1999 Lebby et al.
5,912,653 A * 6/1999 Fitch .................. G09F 9/35
                                                    345/7

(Continued)

FOREIGN PATENT DOCUMENTS

| WO | 2011/080715 | 7/2011 |
|----|-------------|--------|
| WO | 2011/117460 | 9/2011 |
| WO | 2013/153274 | 10/2013 |
| WO | 2015111010  | 7/2015 |

OTHER PUBLICATIONS

Aliexpress, "Item Wireless 2 4ghz Bike Security Vest," website (2016) 1 page, http://www.aliexpress.com/item/Wireless-2-4GHz-Bike-Security-Vest-W-Turn-Signals-Bicycle-Cycling-Safety-Light-Jacket-LED-Bicycle/32218171751.html?spm=2114.40010508.4.101.xin5xv.

(Continued)

*Primary Examiner* — Nicholas Lee
(74) *Attorney, Agent, or Firm* — Michael Best & Friedrich LLP

(57) ABSTRACT

Methods and systems for displaying messages using body-worn electronic display devices. One method includes receiving proximity data indicating a distance between a first electronic display device and a second electronic display device. The method also includes receiving first orientation data indicating an orientation of the first electronic display device and receiving second orientation data indicating an orientation of the second electronic display device. The method also includes determining a distributed message for display based on the proximity data, the first orientation data, and the second orientation data. The distributed message includes a first message for display on the first electronic display device and a second message for display on the second electronic display device. The method also includes displaying, by a controller, the first message on the first electronic display device and the second message on the second electronic display device.

17 Claims, 14 Drawing Sheets

(56) References Cited

U.S. PATENT DOCUMENTS

| | | | |
|---|---|---|---|
| 6,930,608 B2 | 8/2005 | Grajales et al. | |
| 7,377,663 B2 | 5/2008 | Desjardin | |
| 8,341,762 B2 | 1/2013 | Balzano | |
| 8,564,451 B2 | 10/2013 | Novak | |
| 9,224,358 B2* | 12/2015 | Drake | H04B 5/02 |
| 2007/0220652 A1* | 9/2007 | Kuharcik | A41D 27/08 |
| | | | 2/115 |
| 2010/0144283 A1* | 6/2010 | Curcio | G06F 1/1626 |
| | | | 455/66.1 |
| 2013/0328783 A1 | 12/2013 | Martin et al. | |
| 2014/0320739 A1* | 10/2014 | Collier | H04N 9/12 |
| | | | 348/383 |

OTHER PUBLICATIONS

Zyga, "Top Sci-Fi Fashion Clothing of 2007," article (2006) p. 1-6, http://inventorspot.com/articles/memswear_more_top_scifi_fashion__7139.

Hanlon, "Philips Shows Production-Ready Lumalive Textile Garments," article (Sep. 1, 2006) pp. 1-5 http://www.gizmag.com/go/6074/.

CSLK, "The Junkyard Jumbotron is a web tool that makes it really easy to combine a bunch of random displays into a single, large virtual display via the web," website (first known to us Mar. 14, 2016) pp. 1-2, http://c4fcm.github.io/Junkyard-Jumbotron/.

The Next Web, "MWC: The Astonishing Tribe's Cool PlayBook Document-Sharing App," utube (uploaded Feb. 28, 2012) pp. 1-2, https://www.youtube.com/watch?v=Gnu7rQHifYw.

Radikal Events, "Lumalive on TV," utube (uploaded Oct. 2, 2009) pp. 1-2, https://www.youtube.com/watch?gl=SG&hl=en-GB&v=SVX2NhYUb14.

Operand's Video Blog, "Philips Lumalive," utube (uploaded on Oct. 30, 2008) pp. 1-2, https://www.youtube.com/watch?v=2l8jpZQk0Rc&gl=SG&hl=en-GB.

PCT/US2017/026156 International Search Report and Written Opinion of the International Searching Authority dated Jul. 18, 2017 (13 pages).

* cited by examiner

DISPLAYING MESSAGES USING BODY-WORN ELECTRONIC DISPLAY DEVICES

BACKGROUND OF THE INVENTION

First responders, (for example, police officers, fire fighters, and medical personnel) organizers, and others who respond to or are assigned to public events (for example, a public concert, a public conference, and the like) and incidents (for example, crime scenes, fires, and accident scenes) rely on audible commands and instructions (for example, via radio communication) and visual commands (for example, hand motions) to communicate with other professionals as well as the general public. However, situations with high noise, large crowds, and/or low visibility hinder the ability for such individuals to communicate using traditional communication techniques. Additionally, many current communication mechanisms do not allow for simultaneously broadcasting to larger groups of people (for example, fellow first responders and the general public) while engaging in private or restricted-group communications.

When groups of first responders work together (for example, in coordinated tactical situations), the group of first responders often rely on each other for accurate and timely information. While many mechanisms for covert communication (for example, hand signals, audio feeds, and the like) exist, they could be enhanced by additional communication mechanisms.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1B:
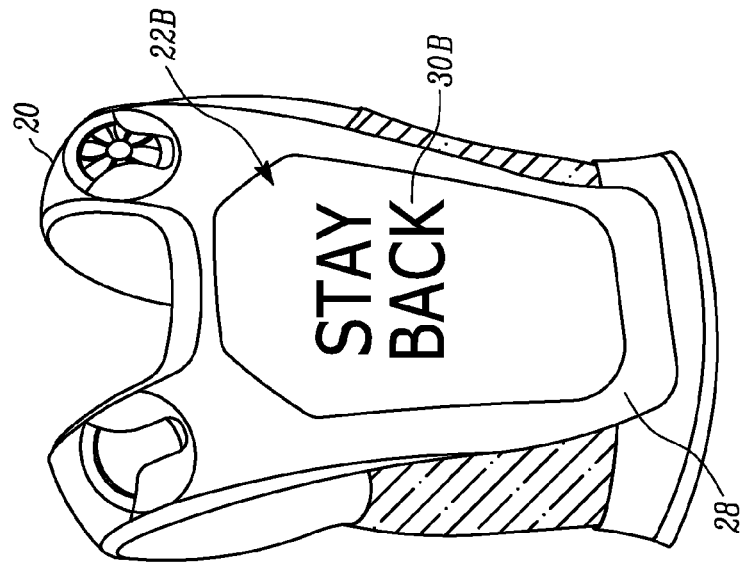
FIG. 1B is a front view of the first electronic display device of FIG. 1A according to one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method for displaying messages using body-worn electronic display devices. In one example, the method includes receiving proximity data indicating a distance between a first electronic display device and a second electronic display device. The first electronic display device and the second electronic display device comprise body-worn electronic display devices. The method also includes receiving first orientation data indicating an orientation of the first electronic display device and receiving second orientation data indicating an orientation of the second electronic display device. The method also includes determining a distributed message for display based on the proximity data, the first orientation data, and the second orientation data. The distributed message includes a first message for display on the first electronic display device and a second message for display on the second electronic display device. The method also includes displaying, by a controller, the first message on the first electronic display device and the second message on the second electronic display device.

Another embodiment provides a system for displaying messages using body-worn electronic display devices. In one example, the system includes a first electronic display device, a second electronic display device, and a controller. The controller includes a memory storing executable instructions and an electronic processor coupled to the memory. The electronic processor is configured to execute the executable instructions to receive proximity data indicating a distance between the first electronic display device and the second electronic display device. The first electronic display device and the second electronic display device comprise body-worn electronic display devices. The electronic processor is also configured to execute the executable instructions to receive first orientation data indicating an orientation of the first electronic display device and to receive second orientation data indicating an orientation of the second electronic display device. The electronic processor is also configured to execute the executable instructions to determine a distributed message for display based on the proximity data, the first orientation data, and the second orientation data. The distributed message includes a first message for display on the first electronic display device and a second message for display on the second electronic display device. The electronic processor is also configured to execute the executable instructions to display the first message on the first electronic display device and the second message on the second electronic display device.

Figure 1A:
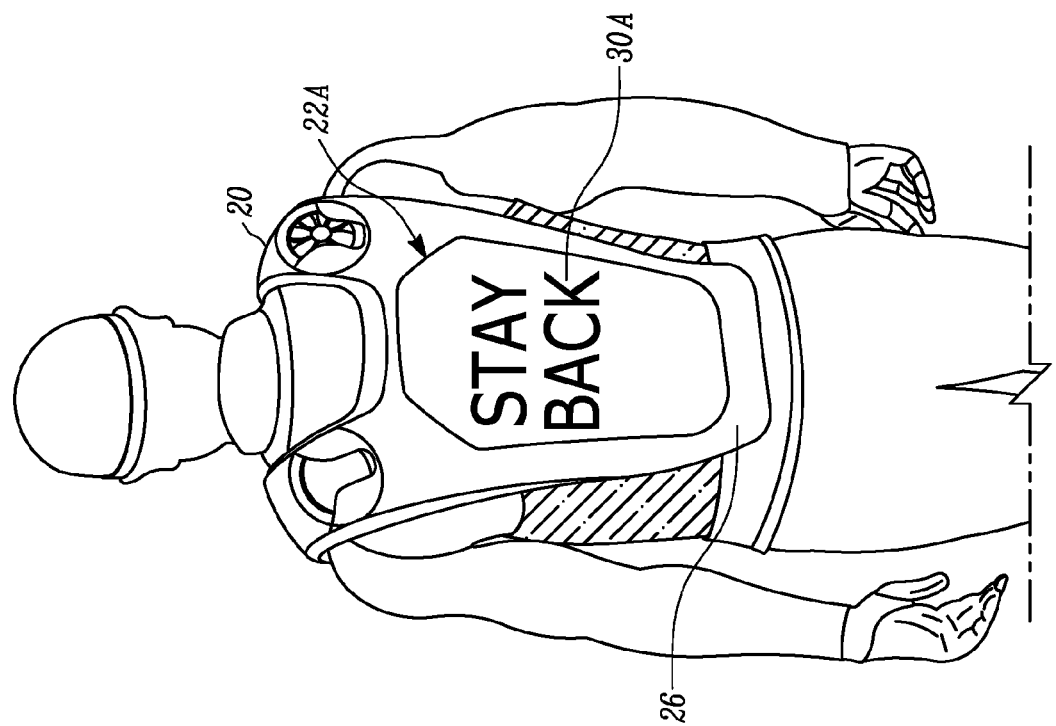
FIG. 1A is a back view of a first electronic display device according to one embodiment.

FIGS. 1A and 1B illustrate a back view and a front view, respectively, of a first electronic display device 20. In the example illustrated, the first electronic display device 20 is a wearable body garment (for example, a vest). In the example illustrated, the first electronic display device 20 includes a first display 22A and a second display 22B. The first display 22A is positioned on a back side 26 of the first electronic display device 20. The second display 22B is positioned on a front side 28 of the first electronic display device 20. In some embodiments, the first display 22A and the second display 22B are positioned in alternative positions or locations. For example, the first display 22A and the second display 22B may be positioned on a side surface, a portion of the front side 28, a portion of the back side 26, or other location of the first electronic display device 20. In some embodiments, an electronic display device includes more or less displays than illustrated in the example. For example, an electronic display device may include, in addition to a first display and a second display, a third display and a fourth display. In some embodiments, the plurality of displays may be positioned on the same surface (e.g., a side surface, the front side 28, the back side 26, or another surface) of an electronic display device. For example, a back side of an electronic display device may include a first display, a second display, a third display, and a fourth display while a front side of the electronic display device does not include a display. In some embodiments, each of a front side, a back side, a left side, and a right side of an body-worn electronic display device includes one or more displays.

The first display 22A and the second display 22B may be, for example, a light emitting diode (LED) array display, a liquid crystal display (LCD), or other display that is suitable for being worn on the body. The first display 22A may display a first message 30A and the second display 22B may display a second message 30B. In the example shown, the first message 30A and the second message 30B are the words "STAY BACK." The first message 30A and the second message 30B may include various other words, symbols, numbers, animations, videos, or combinations of the same. The first message 30A and the second message 30B may or may not be the same.

Figure 2:
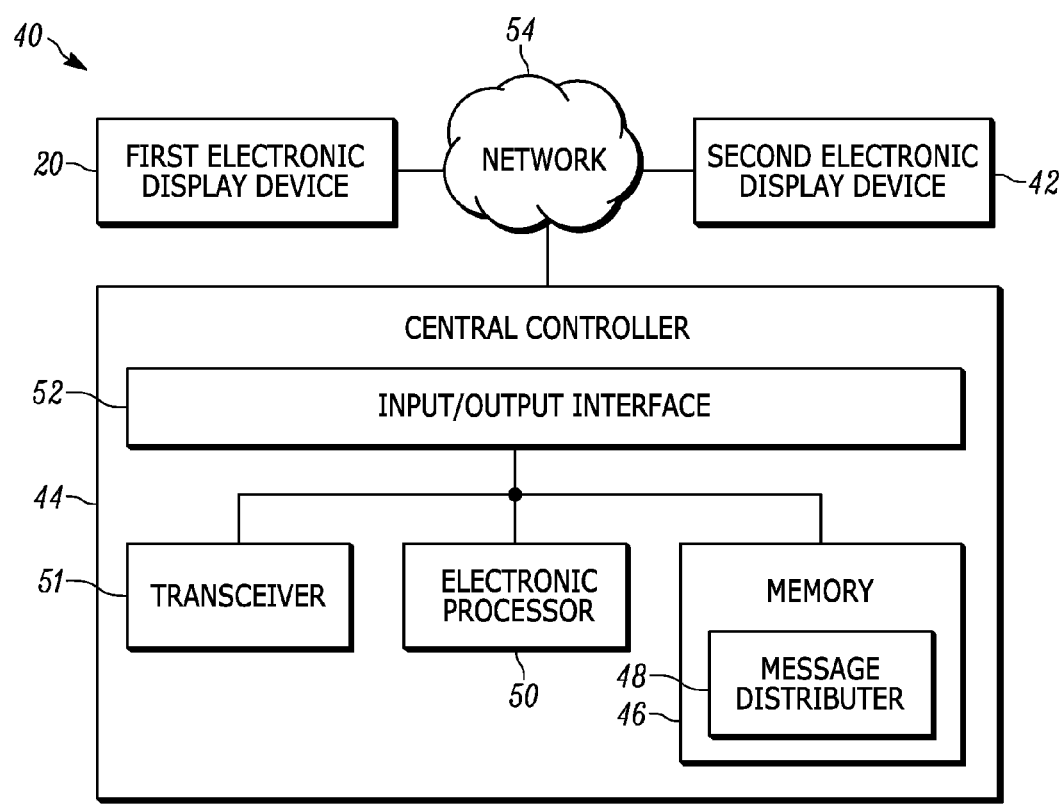
FIG. 2 illustrates a system for displaying messages using the first electronic display device of FIGS. 1A and 1B and a second electronic display device.

FIG. 2 illustrates a system 40 for displaying messages using body-worn electronic display devices (for example, the first electronic display device 20) according to one embodiment. The system 40 includes the first electronic display device 20, a second electronic display device 42, and a central controller 44. In the illustrated example, the central controller 44 is a remote device (for example, a remote computing device). In some embodiments, the central controller 44 is included in one of the body-worn electronic display devices. In such embodiments, roles are assigned to the electronic display devices such as a lead electronic display device and a follower electronic display device. In other embodiments, the functionality of the central controller 44 is distributed among the body-worn electronic display devices without assigning roles. For example, the functionality of the central controller 44 may be based on a group consensus (e.g., using set protocols and communications among group members) where each of the body-worn electronic display devices contributes to the functionality of the central controller 44.

The central controller 44 includes combinations of hardware and software that are operable to, among other things, control the display of messages. In some embodiments, the central controller 44 includes a message distributer 48. The message distributer 48 may control, as described in more detail below, the distribution and apportioning of a distributed message for display across multiple body-worn electronic display devices (for example, the first electronic display device 20 and the second electronic display device 42).

In the example illustrated, the central controller 44 includes an electronic processor 50 (for example, a microprocessor or other suitable device), a memory 46, a transceiver 51, and an input/output interface 52. The electronic processor 50, the memory 46, the transceiver 51, and the input/output interface 52 communicate over one or more control or data connections or buses. The electronic processor 50 is configured to retrieve, from the memory 46, instructions related to the display processes and methods described herein. The electronic processor 50 is also configured to execute those instructions. The memory 46 is an example of a non-transitory computer readable medium and may include, for example, a program storage area and a data storage area. The program storage area and the data storage area may include combinations of different types of memory, including read only memory (ROM) and random access memory (RAM). The software may include one or more applications, program data, filters, rules, one or more program modules, and other executable instructions (for example, the message distributer 48).

The input/output interface 52 allows the central controller 44 (and its components) to communicate with external devices and various input and output devices. In the example shown, the central controller 44 communicates with the first electronic display device 20 and the second electronic display device 42 through the input/output interface 52 via a network 54. The input/output interface 52 may include a port or other connector for connecting to the transceiver 51. The transceiver 51 may be used to establish a wireless connection via the network 54 to the first electronic display device 20 and/or the second electronic display device 42. In some embodiments, the network 54 is a local area network ("LAN") and may be implemented using short-range wireless technologies and protocols (e.g., land mobile radio system (LMRS), long term evolution (LTE) system, Bluetooth, ZigBee, or another suitable short-range wireless system). However, the network 54 may be configured to as wide area network ("WAN") if the distance between devices is relatively large. The central controller 44 may also receive input, via the input/output interface 52, from one or more peripheral devices, including a keyboard, a pointing device (for example, a mouse), buttons on a touch screen, a scroll ball, mechanical buttons, or other devices. Similarly, the central controller 44 may provide output, via the input/output interface 52, to one or more peripheral devices, including a display device, a touch screen, a printer, a speaker, and the like. In some embodiments, output is provided as part of a graphical user interface ("GUI") (for example, generated by the electronic processor 50 from instructions and data stored in the memory 46 and presented on a touch screen or other display) that enables a user to interact with the central controller 44.

Figure 3A:
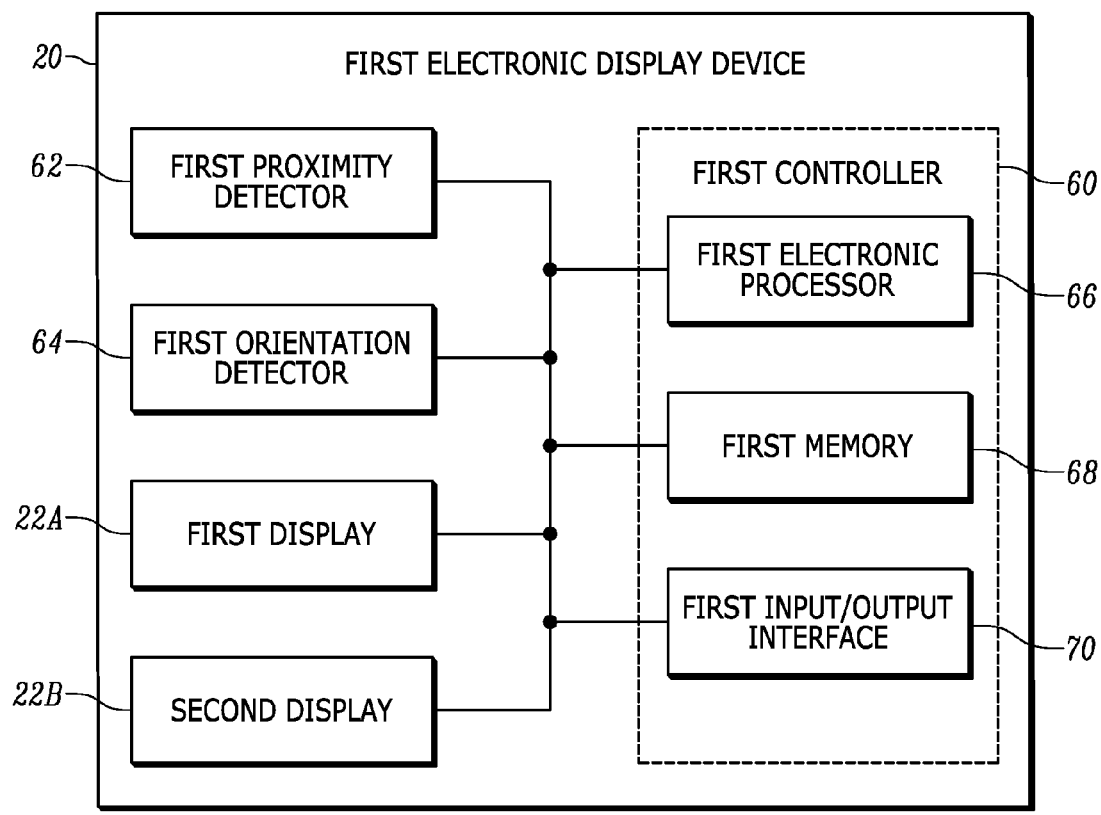
FIG. 3A illustrates components of the first electronic display according to one embodiment.

FIG. 3A illustrates components of the first electronic display device 20. In some embodiments, the first electronic display device 20 includes a first controller 60, a first proximity detector 62, a first orientation detector 64, the first display 22A, and the second display 22B. The first controller 60, the first proximity detector 62, the first orientation detector 64, the first display 22A, and the second display 22B communicate over one or more control or data connections or buses. The illustrated electronic display device is but one example, as the electronic display device may include more or less components than the example electronic display device illustrated.

The first proximity detector 62 senses or detects objects located near the first electronic display device 20 and outputs proximity data. The first proximity detector 62 may include, for example, a laser range finder, an ultrasonic sensor, and/or another sensor. The proximity data may include, for example, the distance between a body-worn electronic display device and another body-worn electronic display device. In some embodiments, the proximity data also includes a distance between a body-worn electronic display device and another object (for example, a building, a vehicle, and the like). The proximity data may include multiple distances and may be associated with multiple body-worn electronic display devices.

The first orientation detector 64 senses or detects orientation data (for example, first orientation data) associated with the first electronic display device 20. The first orientation detector 64 may be, for example, an accelerometer, an inertial measurement unit (IMU), or another sensor. The first orientation data may include, for example, the orientation (for example, north, south, east, west, and the like) of the first electronic display device 20, the angle of the first electronic display device 20 in relation to the ground (where an angle of 90° represents that the first electronic display device 20 is perpendicular to the ground), and the like.

The first controller 60, as illustrated in FIG. 3A, includes a first electronic processor 66, a first memory 68, and a first input/output interface 70. The first electronic processor 66, the first memory 68, and the first input/output interface 70 communicate over one or more control or data connections or buses. The basic operations and numerous variations of the first electronic processor 66, the first memory 68, and the first input/output interface 70 are similar to those described with respect to other electronic processors, memory, and input/output interfaces described herein. Thus, further details of these aspects are not provided other than to note, as should be apparent, that in certain embodiments the first electronic processor 66 executes computer-readable instructions ("software") stored, for example, in the first memory 68.

The first controller 60 may communicate with another body-worn electronic display device (for example, the second electronic display device 42) and/or the central controller 44 through the first input/output interface 70. The first input/output interface 70 may include a port or other connector to electrically couple the first controller 60 to a transceiver, which may be used to establish a wireless connection between the central controller 44 and/or another body-worn electronic display device (for example, over the network 54). The first input/output interface 70 allows the first electronic display device 20 to communicate with the message distributer 48 of the central controller 44 and for the central controller 44 to send controls signals and messages to the first display 22A and the second display 22B.

Figure 3B:
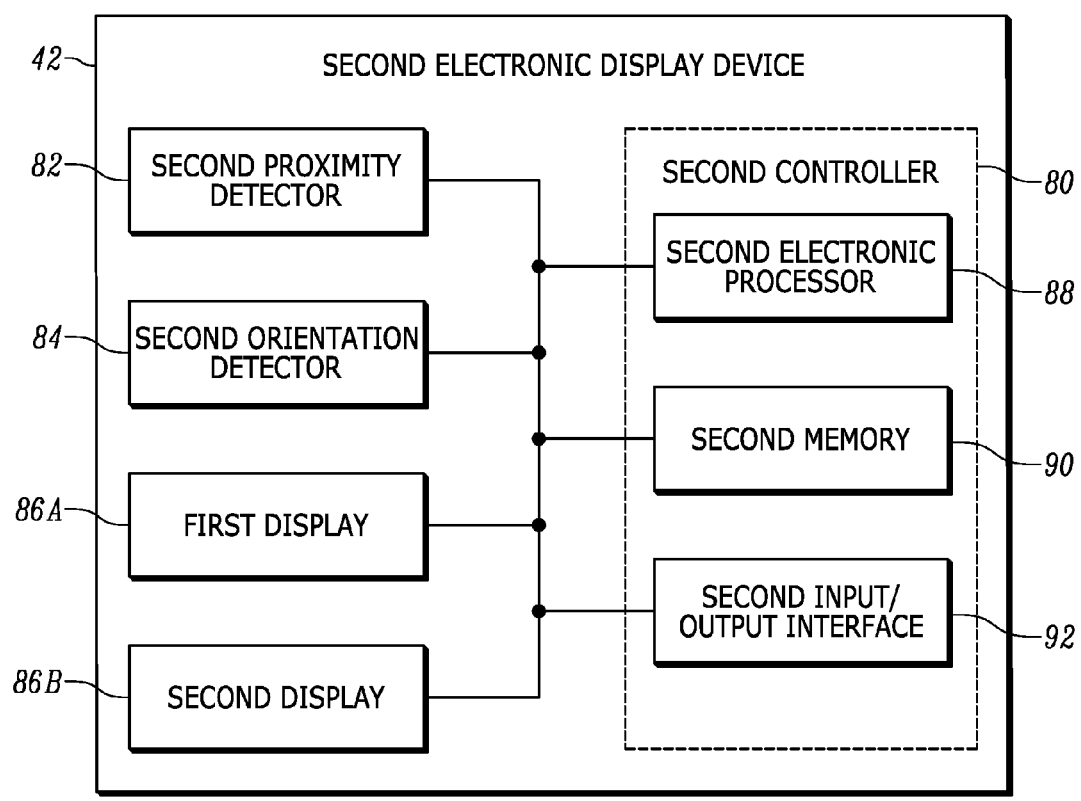
FIG. 3B illustrates components of the second electronic display device according to one embodiment.

In the example illustrated in FIG. 3B, the second electronic display device 42 includes a second controller 80, a second proximity detector 82, a second orientation detector 84, a first display 86A, and a second display 86B. The illustrated electronic display device is but one example, as the electronic display device may include more or less components than the example electronic display device illustrated. The second controller 80, the second proximity detector 82, the second orientation detector 84, the first display 86A, and the second display 86B communicate over one or more control or data connections or buses. The second proximity detector 82 is used to sense the proximity of objects to the second electronic display device 42 and outputs proximity data. The second orientation detector 84 senses an orientation of the second electronic device and outputs orientation data (for example, second orientation data).

The second controller 80 includes a second electronic processor 88 (for example, a microprocessor or other suitable device), a second memory 90, and a second input/output interface 92. The second electronic processor 88, the second memory 90, and the second input/output interface 92 communicate over one or more control or data connections or buses. The basic operations and numerous variations of the second electronic processor 88, the second memory 90, and second input/output interface 92 are similar to those described with respect to other electronic processors, memory, and input/output interfaces described herein.

As mentioned above, the central controller 44 executes instructions to perform one or more of the methods described herein. The methods are described in terms of displaying messages using the first electronic display device 20, the second electronic display device 42, and/or additional electronic display devices (for example, a third electronic display device, a fourth electronic display device, and the like). However, the methods may be applied to other types of body-worn electronic display devices and are not limited to the examples provided.

Figure 4:
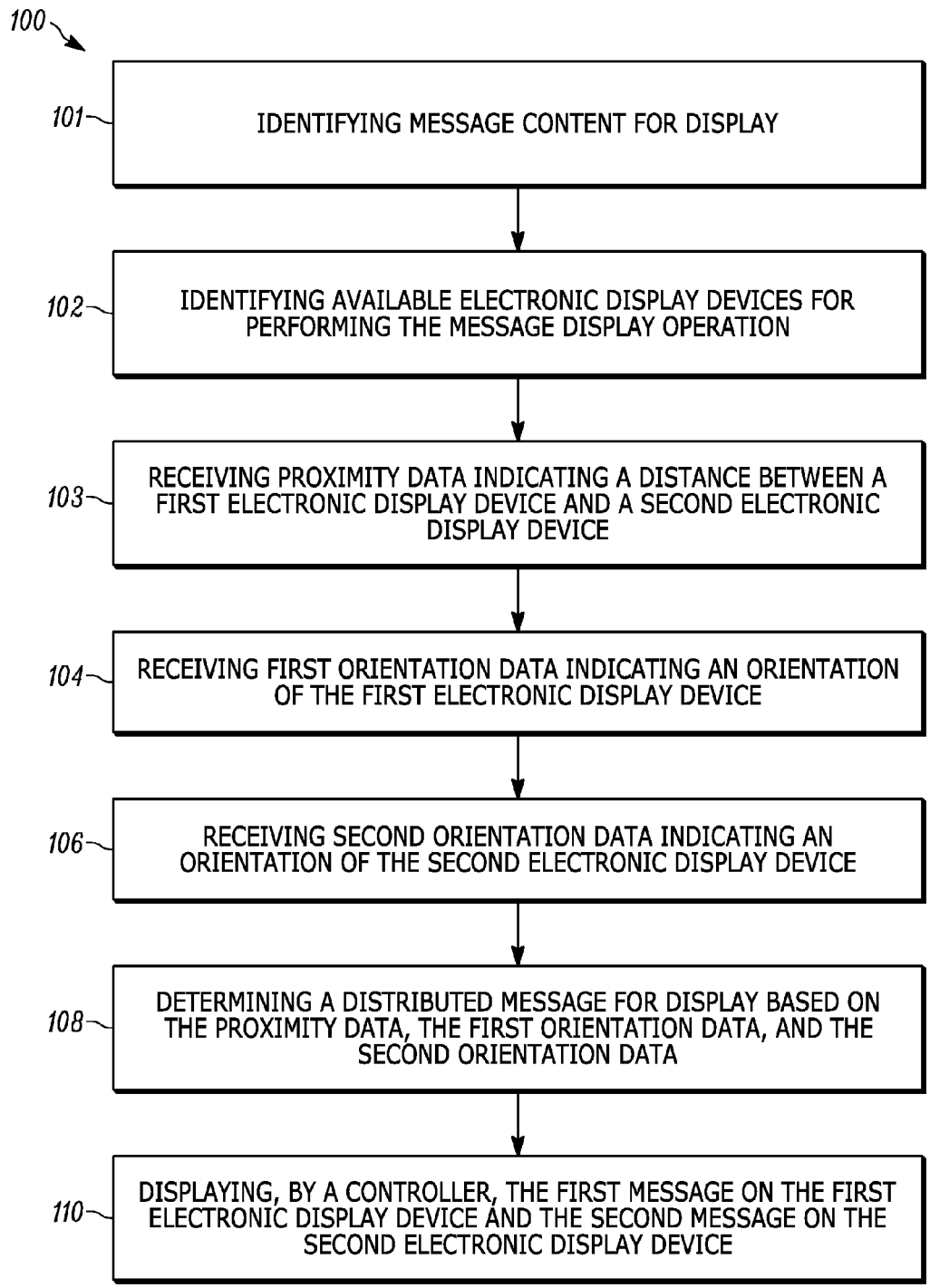
FIG. 4 is a flowchart of a method of displaying messages according to one embodiment.

FIG. 4 illustrates a method 100, in accordance with one embodiment, of displaying one or more messages using body-worn electronic display devices using the system 40 illustrated in FIG. 2. The method 100 includes identifying message content for display in response to an initiation of a message display operation (at block 101). The content of the message is identified by, for example, the central controller 44, the first controller 60, or the second controller 80 for display using body-worn electronic display devices. For example, if the body-worn electronic display devices are implemented within a crowd control context, a safety personnel operator may initiate a message display operation for that specific crowd control context (e.g., the message for display may include "STAY BACK"). The operation may be initiated based on user input received by the central controller 44, the first electronic display device 20, or the second electronic display device 42.

The method 100 also includes identifying available body-worn electronic display devices for performing the initiated message display operation (at block 102). In some embodiments, the availability of body-worn electronic display devices is identified based on availability data received from the central controller 44. For example, a safety personnel operator may communicate with the central controller 44 (via the input/output interface 52) that two body-worn electronic display devices (e.g., the first body-worn electronic display device 20 and the second body-worn electronic display device 42) were dispatched to a scene (e.g., a public event for crowd control). Thus, the first body-worn electronic display device 20 and the second body-worn electronic display device 42 are available for performing the message display device initiated at block 101 of the method 100. In some embodiments, the availability of body-worn electronic display devices is identified based on real-time data (e.g., the proximity data) collected by the body-worn electronic display devices at a scene. For example, body-worn electronic display devices that are within a predetermined proximity to each other may be identified as being available for performing the message display operation initiated at block 101 of the method 100. A plurality of body-worn electronic display devices may be identified as available for performing the initiated message display operation. Although the description of the method 100 only includes reference to the first electronic display device 20 and the second electronic display device 42, the methods described herein may be implemented when more or less body-worn electronic display devices are identified as available for performing the initiated message display operation.

The method 100 also includes receiving proximity data indicating a distance between the first electronic display device 20 and the second electronic display device 42 (at block 103). The proximity data may be received by the central controller 44 via the input/output interface 52 of the central controller 44 from the first proximity detector 62 and/or the second proximity detector 82.

The method 100 also includes receiving first orientation data indicating an orientation of the first electronic display device 20 (at block 104). The first orientation data may be received by the central controller 44 via the input/output interface 52 of the central controller 44 from the first orientation detector 64.

Receiving second orientation data indicating an orientation of the second electronic display device 42 occurs at block 106. The second orientation data may be received by the central controller 44 via the input/output interface 52 of the central controller 44 from the second orientation detector 84.

Determining a distributed message for display including how to distribute the message content identified in block 101 based on the proximity data, the first orientation data, and the second orientation data occurs at block 108. As mentioned above, the message distributer 48 may control the distribution and apportioning of a message to be displayed across multiple body-worn electronic display devices. The message distributer 48 may, for example, control what distributed message to display on one or more body-worn electronic display devices, and how to display the distributed message on the one or more body-worn electronic display device. The distributed message may be broken down into one or more messages (for example, a first message, a second message, and the like) based on the received proximity data and the received orientation data (for example, the first orientation data and the second orientation data).

Figure 5:
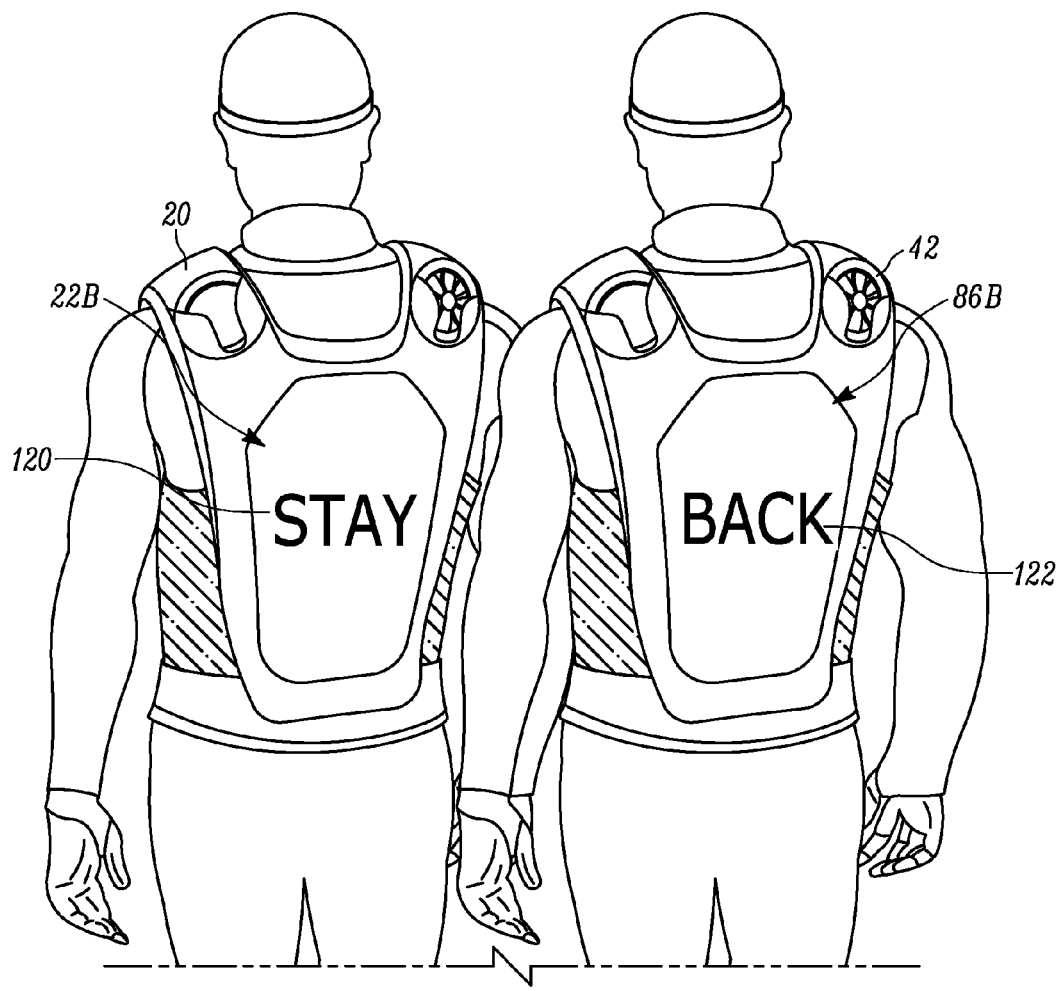
FIG. 5 illustrates displaying a distributed message via the first electronic display device of FIG. 3A and the second electronic display device of FIG. 3B according to one embodiment.

The method 100 also includes displaying, by a controller (for example, the first controller 60 and/or the second controller 80), the first message on the first electronic display device 20 and the second message on the second electronic display device 42 (at block 110). As noted, the distributed message may be the same and in one embodiment include the words "STAY BACK." However, the distributed message may be broken into a first message 120 that includes the word "STAY" and a second message 122 that includes the word "BACK." In the example illustrated in FIG. 5, the first message 120 is displayed via the first display 22A of the first electronic display device 20 and the second message 122 is displayed via the first display 86A of the second electronic display device 42.

Figure 6:
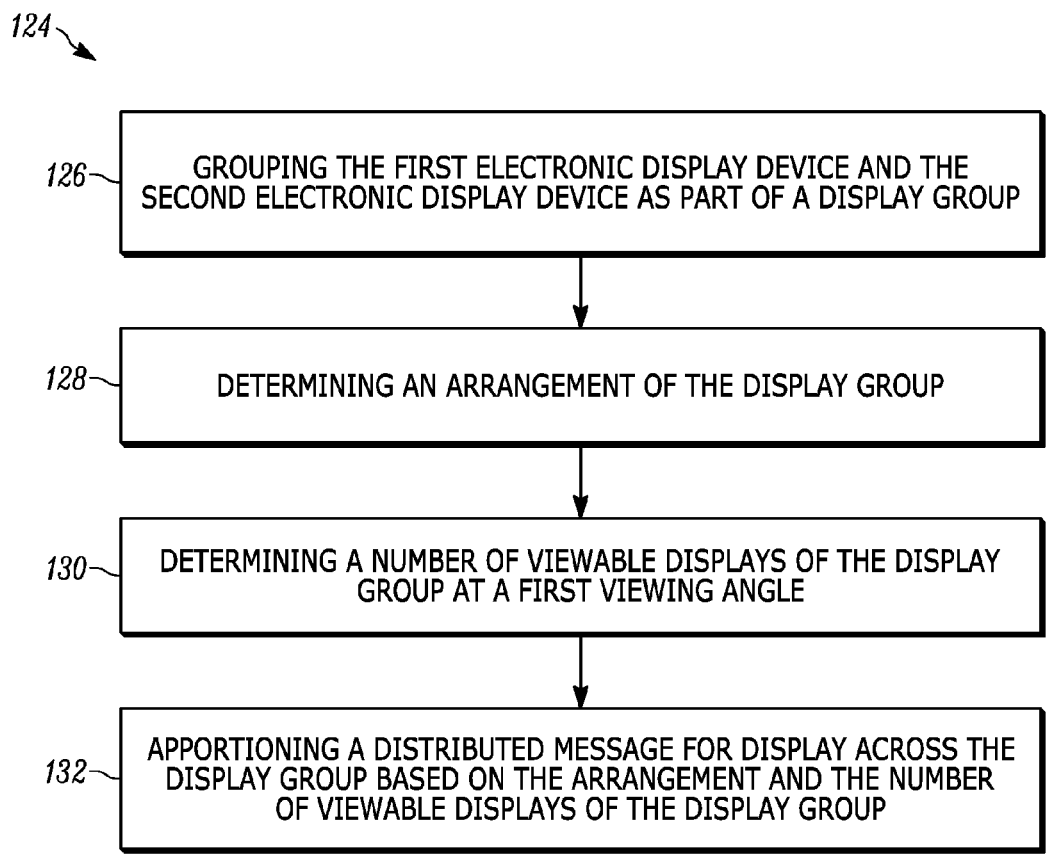
FIG. 6 is a flowchart of a method of determining a distributed message for display according to one embodiment.

FIG. 6 illustrates a method 124 of determining a distributed message for display and provides additional detail regarding the process performed at block 108 of method 100 according to one embodiment. The method 124 includes grouping the first electronic display device 20 and the second electronic display device 42 as part of a display group (at block 126). In other embodiments, other groupings of devices are created. In addition, more than one display group may be created. The grouping of the first electronic display device 20 and the second electronic display device 42 may be based on the proximity data received by the central controller 44.

In some embodiments, the body-worn electronic display devices are grouped into a display group when the devices are within a predetermined proximity threshold (for example, a predetermined distance threshold). For example, the proximity data may indicate that the distance between the first electronic display device 20 and the second electronic display device 42 is within a proximity threshold of, for example, two feet. When distance is at or below the predetermined threshold, the first electronic display device 20 and the second electronic display device 42 are grouped as part of a display group.

Figure 7:
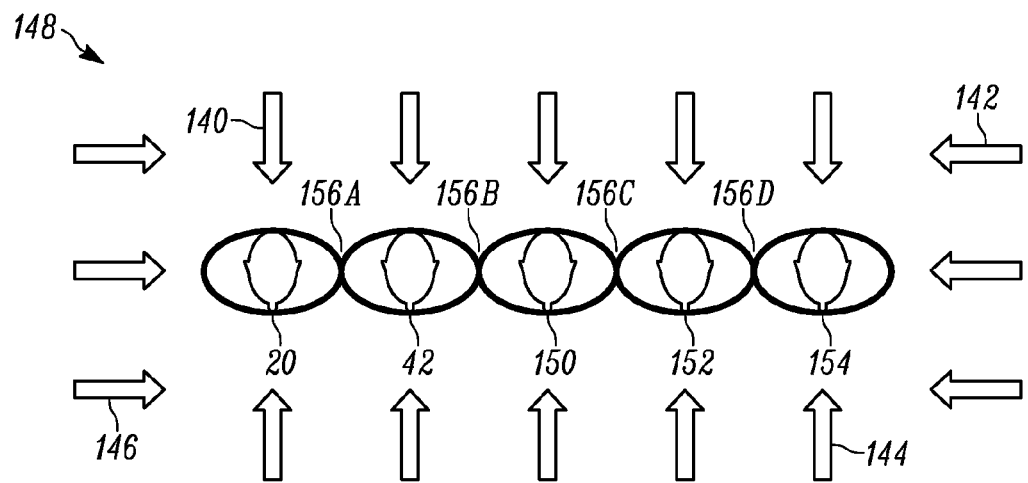
FIGS. 7 through 12 illustrate arrangements and viewing angles of a display group.
Figure 9:
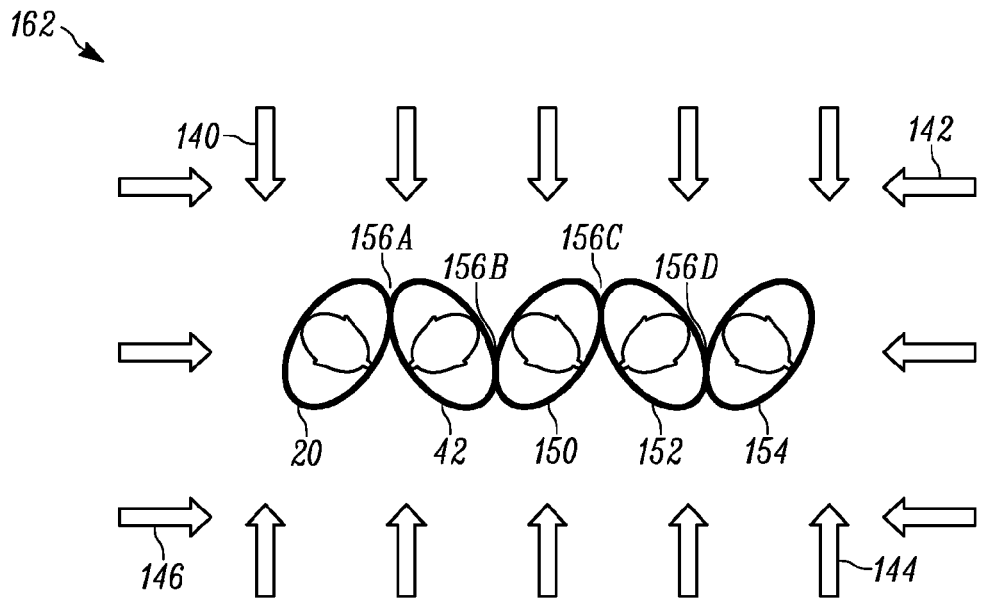
Figure 10:
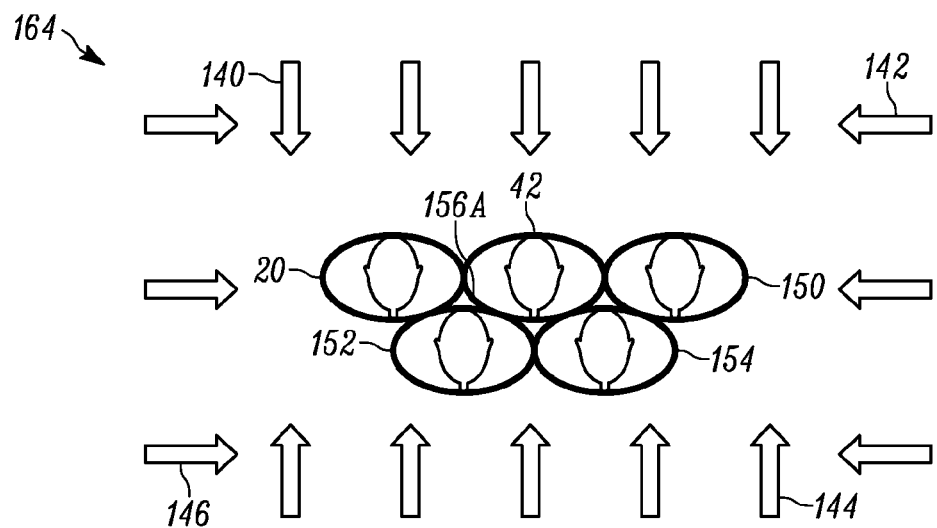
Figure 12:
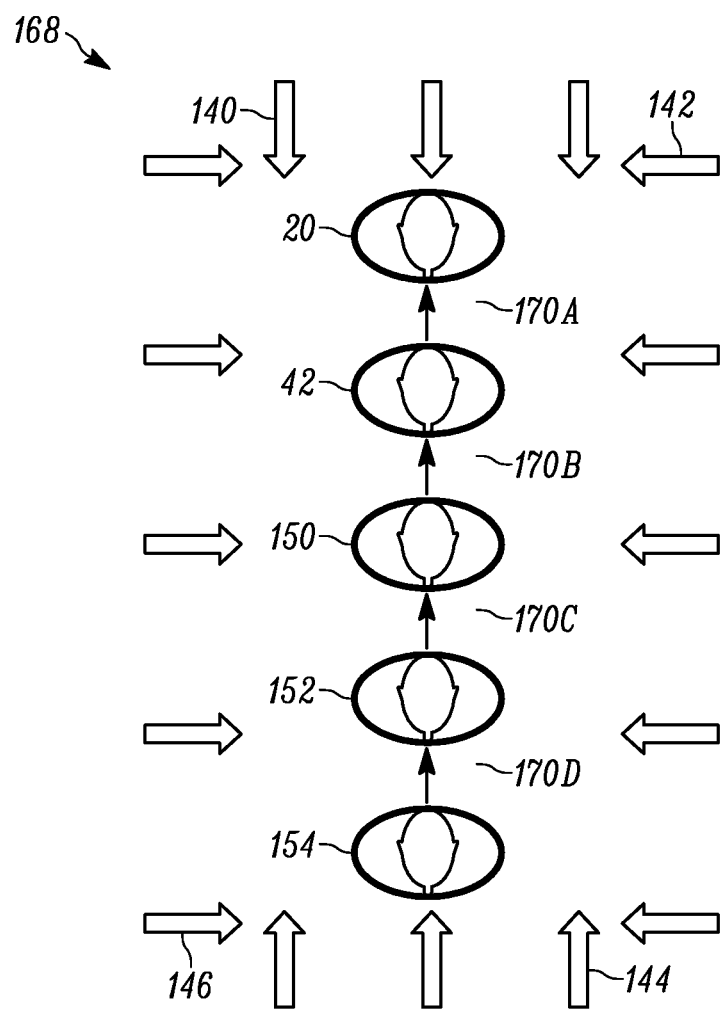

Once the display group is grouped, the method 124 determines an arrangement of the display group (at block 128). The arrangement of the display group may be determined based upon the proximity data and/or the orientation data associated with each of the body-worn electronic display devices included in the display group. The arrangement of the display group may include a straight line where each wearer of a body-worn electronic display device is shoulder to shoulder (as seen in FIG. 7). In other circumstances, the arrangement may include a non-straight line where planes defined by the chest or back of each wearer of a body-worn electronic display device are at ninety-degree angles with respect to one another (as seen in FIG. 9). A trapezoid-shaped arrangement is illustrated in FIG. 10. A second straight line arrangement where each wearer of a body-worn electronic display device is facing the same direction (for example, back to back) is shown in FIG. 12. Other arrangements of the display group are possible.

The method 124 also includes determining a number of viewable displays of the display group at a first viewing angle (at block 130). In some embodiments, the method 124 also determines a number of viewable displays of the display group at additional viewing angles (for example, a second viewing angle, a third viewing angle, and the like). Depending on the determined arrangement of the one or more body-worn electronic display devices within the display group, some of the displays included within the display group may be blocked. This creates one or more blind spots. For example, if the first electronic display device 20 and the second electronic display device 42 are within a display group and the first electronic display device 20 is arranged directly in front of the second electronic display device 42, the first display 22A of the first electronic display device 20 is not a viewable because the second electronic display device 42 is blocking the view of the first display 22A.

Once the number of viewable displays is determined at a first viewing angle, the method 124 apportions the distributed message for display across the display group based on the arrangement and the number of viewable displays of the display group (at block 132). For example, if a display is not a viewable display, the message distributer 48 controls the system 40 so that the message or applicable portion thereof is not displayed other the blocked display. In some embodiments, the first message 120 is apportioned from the distributed message before the first message 120 is displayed via the first electronic display device 20 and the second message 122 is apportioned from the distributed message before the second message 122 is displayed via the second electronic display device 42.

In some embodiments, block 130 and block 132 are repeated for each viewing angle of a display group. As an example, the distributed message on a front display of a body-worn electronic display device may be different than the distributed message on a back display of the body-worn electronic display device.

FIGS. 7 through 12 schematically illustrate various examples of a display group. Each example arrangement of a display group may include one or more viewing angles. Each viewing angle may be a public viewing angle or a private viewing angle. A public viewing angle may include a viewing angle in which the public may view a message displayed via the body-worn electronic display device. A private viewing angle may include a viewing angle in which the public cannot view the message displayed via the body-worn electronic display device. As described in more detail below, the private viewing angle allows limited viewing of the displayed message (for example, first responder to first responder communication).

In some embodiments, message content identified in block 101 of FIG. 4 is further identified as being either a public message or a private message. For example, the message content may be identified as public or private based on received user input specifying that content as public or private or based on other information regarding the context of a scene that is received. Further, in some embodiments at block 130 of FIG. 6, each viewing angle of a display group is identified as either a private or public viewing angle. Then, in block 132, message content identified as public is displayed at viewing angles determined to be public and, in some examples, also at viewing angles determined to be private. However, in these embodiments, message content identified as private is displayed at viewing angles determined to be private, but not at viewing angles determined to be public. Accordingly, certain message content can remain private within the display group.

FIG. 7 illustrates the first electronic display device 20, the second electronic display device 42, a third electronic display device 150, a fourth electronic display device 152, and a fifth electronic display device 154 in a first arrangement 148. In the example illustrated, the first arrangement 148 is a straight line where each wearer of a body-worn electronic display device is facing the same direction and standing shoulder to shoulder. The first arrangement 148 includes four public viewing angles (for example, viewing angles 140, 142, 144, and 146). The first arrangement 148 also has four blind spots. A first blind spot 156A is positioned between the first electronic display device 20 and the second electronic display device 42. A second blind spot 156B is positioned between the second electronic display device 42 and the third electronic display device 150. A third blind spot 156C is positioned between the third electronic display device 150 and the fourth electronic display device 152. A fourth blind spot 156D is positioned between the fourth electronic display device 152 and the fifth electronic display device 154. In the first arrangement 148 each blind spot blocks a side display of one body-worn electronic display device and a side display of another body-worn electronic display device. For example, the first blind spot 156A blocks a side display of the first electronic display device 20 and a side display of the second electronic display device 42.

Figure 8:
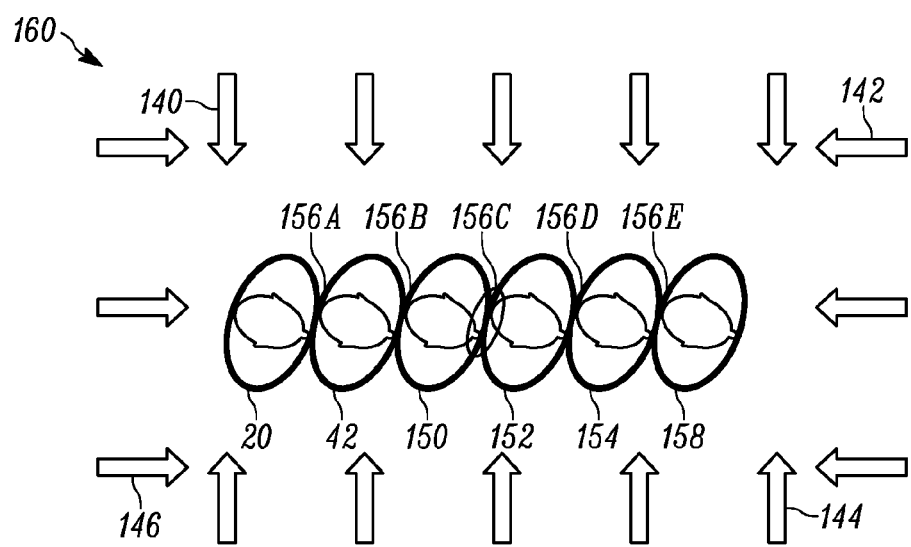

FIG. 8 illustrates the first electronic display device 20, the second electronic display device 42, the third electronic display device 150, the fourth electronic display device 152, the fifth electronic display device 154, and a sixth electronic display device 158 in a second arrangement 160. The second arrangement 160 is a straight line where each wearer of a body-worn electronic display device is facing the back of another wearer of a body-worn electronic display device at an angle of approximately forty-five degrees. In the example provided, the second arrangement 160 includes four public viewing angles (for example, viewing angles 140, 142, 144, and 146). The second arrangement 160 has five blind spots. The first blind spot 156A is positioned between the first electronic display device 20 and the second electronic display device 42. The second blind spot 156B is positioned between the second electronic display device 42 and the third electronic display device 150. The third blind spot 156C is positioned between the third electronic display device 150 and the fourth electronic display device 152. The fourth blind spot 156D is positioned between the fourth electronic display device 152 and the fifth electronic display device 154. The fifth blind spot 156E is positioned between the fifth electronic display device 154 and the sixth electronic display device 158. In the second arrangement 160 each blind spot blocks a first display of one body-worn electronic display device and a second display of another body-worn electronic display device. For example, the first blind spot 156A blocks the second display 22B of the first electronic display device 20 and blocks the first display 86A of the second electronic display device 42.

FIG. 9 illustrates the first electronic display device 20, the second electronic display device 42, the third electronic display device 150, the fourth electronic display device 152, and the fifth electronic display device 154 in a third arrangement 162. The third arrangement 162 is a curved line where each wearer of a body-worn electronic display device is standing shoulder to shoulder at approximately ninety-degrees. The third arrangement 162 includes four public viewing angles (for example, viewing angles 140, 142, 144, and 146). The second arrangement 160 has four blind spots. As seen in FIG. 9, the first blind spot 156A is positioned between the first electronic display device 20 and the second electronic display device 42. The second blind spot 156B is positioned between the second electronic display device 42 and the third electronic display device 150. The third blind spot 156C is positioned between the third electronic display device 150 and the fourth electronic display device 152. The fourth blind spot 156D is positioned between the fourth electronic display device 152 and the fifth electronic display device 154. In the third arrangement 162 each blind spot blocks a side display of one body-worn electronic display device and a side display of another body-worn electronic display device. For example, the first blind spot 156A blocks a side display of the first electronic display device 20 and a side display of the second electronic display device 42.

FIG. 10 illustrates the first electronic display device 20, the second electronic display device 42, the third electronic display device 150, the fourth electronic display device 152, and the fifth electronic display device 154 in a fourth arrangement 164. The fourth arrangement 164 is a trapezoid-shaped arrangement with the first electronic display device 20, the second electronic display device 42, and the third electronic display device 150 in a straight line directly behind the fourth electronic display device 152 and the fifth electronic display device 154. The fourth arrangement 164 can include four public viewing angles (for example, viewing angles 140, 142, 144, and 146). The fourth arrangement 164 has one blind spot. As seen in FIG. 10, the first blind spot 156A is centrally located in the middle of the trapezoid-shaped arrangement. In the fourth arrangement 164 the first blind spot 156A blocks a variety of displays associated with the body-worn electronic display devices of the display group. For example, the second display 86B of the second electronic display device 42 is blocked from viewing, a first display of the fourth electronic display device 152 is blocked from viewing, and a first display of the fifth electronic display device 154 is blocked from viewing.

Figure 11:
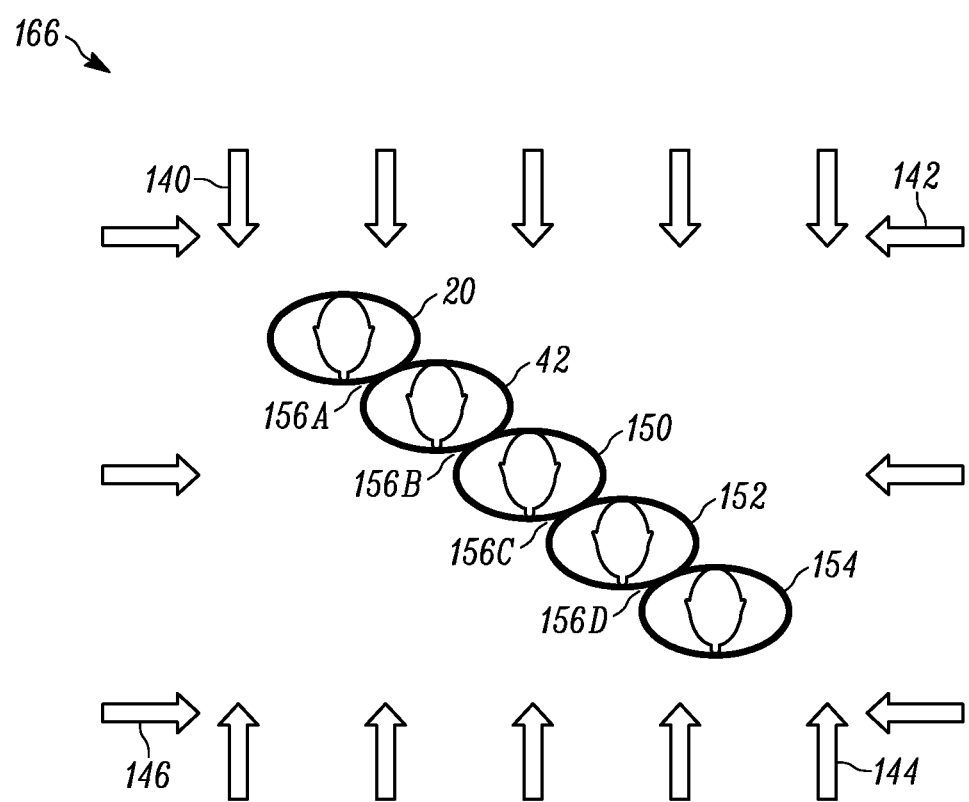

FIG. 11 illustrates the first electronic display device 20, the second electronic display device 42, the third electronic display device 150, the fourth electronic display device 152, and the fifth electronic display device 154 in a fifth arrangement 166. The fifth arrangement 166 is a diagonal line where each wearer of a body-worn electronic display device is staggered and is facing the same direction. The fifth arrangement 166 can include four public viewing angles (for example, viewing angles 140, 142, 144, and 146). The fifth arrangement 166 has four blind spots. As seen in FIG. 11, the first blind spot 156A is positioned between the first electronic display device 20 and the second electronic display device 42. The second blind spot 156B is positioned between the second electronic display device 42 and the third electronic display device 150. The third blind spot 156C is positioned between the third electronic display device 150 and the fourth electronic display device 152. The fourth blind spot 156D is positioned between the fourth electronic display device 152 and the fifth electronic display device 154. In the fifth arrangement 166 each blind spot blocks a portion of a second display of one body-worn electronic display device and a portion of a first display of another body-worn electronic display device. For example, the first blind spot 156A blocks a portion of the second display 22B of the first electronic display device 20 and a portion of the first display 86A of the second electronic display device 42.

FIG. 12 illustrates the first electronic display device 20, the second electronic display device 42, the third electronic display device 150, the fourth electronic display device 152, and the fifth electronic display device 154 in a sixth arrangement 168. The sixth arrangement 168 is a straight line where each wearer of a body-worn electronic display device is facing the same direction directly behind or in front of another wearer of a body-worn electronic display device. The sixth arrangement 168 can include four public viewing angles (for example, viewing angles 140, 142, 144, and 146) and four private viewing angles (for example, private viewing angles 170A, 170B, 170C, and 170D). Each private viewing angle allows for communication between each wearer of a body-worn electronic display device. For example, private viewing angle 170A allows only the wearer of the second electronic display device 42 to read a message displayed via the first display 22A of the first electronic display device 20.

In some embodiments, the distributed message is continuously updated. For example, the distributed message may be continuously updated depending on whether an additional electronic display device is placed within a display group, whether an electronic display device is removed from a display group, whether the arrangement of the display group has changed, and the like. Accordingly, methods described herein may further include receiving updated proximity data and updated orientation data (for example, updated first orientation data, updated second orientation data, and the like). The message distributer 48 may use the received updated proximity data and updated orientation data to dynamically re-apportion the distributed message for display across one or more body-worn electronic display devices.

Figure 13:
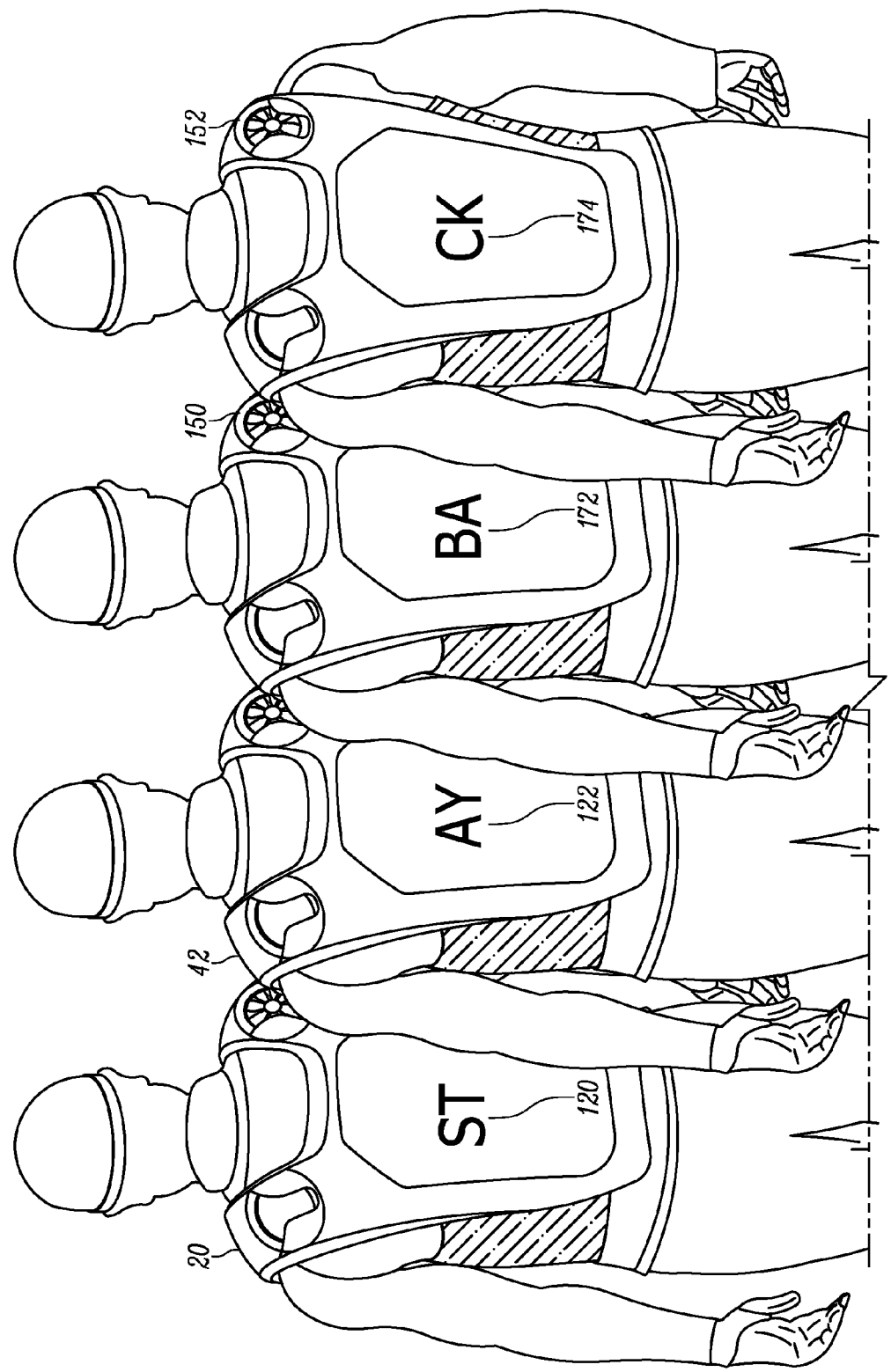
FIG. 13 illustrates dynamically re-apportioning a distributed message via the first electronic display device of FIG. 3A, the second electronic display device of FIG. 3B, a third electronic display device, and a fourth electronic display device according to one embodiment.

As described above, FIG. 5 illustrates displaying a distributed message across a display group including the first electronic display device 20 and the second electronic display device 42. When the third electronic display device 150 and the fourth electronic display device 152 come within a predetermined proximity of the display group of the first electronic display device 20 and the second electronic display device 42, the third electronic display device 150 and the fourth electronic display device 152 may be automatically added to the display group (e.g., through an updating of block 102 of FIG. 4). When the third electronic display device 150 and the fourth electronic display device 152 are added to the display group the message distributer 48 may dynamically re-apportion the distributed message for display across the display group based on the updated proximity data and the updated orientation data (for example, updated first orientation data, updated second orientation data, third orientation data associated with the third electronic display device 150, and fourth orientation data associated with the fourth electronic display device 152). As illustrated in FIG. 13, the message distributer 48 may re-apportion the distributed message across the first electronic display device 20, the second electronic display device 42, the third electronic display device 150, and the fourth electronic display device 152. As mentioned above, the distributed message displayed from the viewing angle of the display group as illustrated in FIG. 13 may not be the same distributed message from another viewing angle of the same display group. For example, the distributed message displayed from a first viewing angle (e.g., a back viewing angle) may be displayed in reverse for a second viewing angle (e.g., a front viewing angle).

For example, the first electronic display device 20 may display the first message 120 reading "ST", the second electronic display device 42 may display the second message 122 reading "AY", the third electronic display device 150 may display a third message 172 reading "BA", and the fourth electronic display device 152 may display a fourth message 174 reading "CK".

Figure 14:
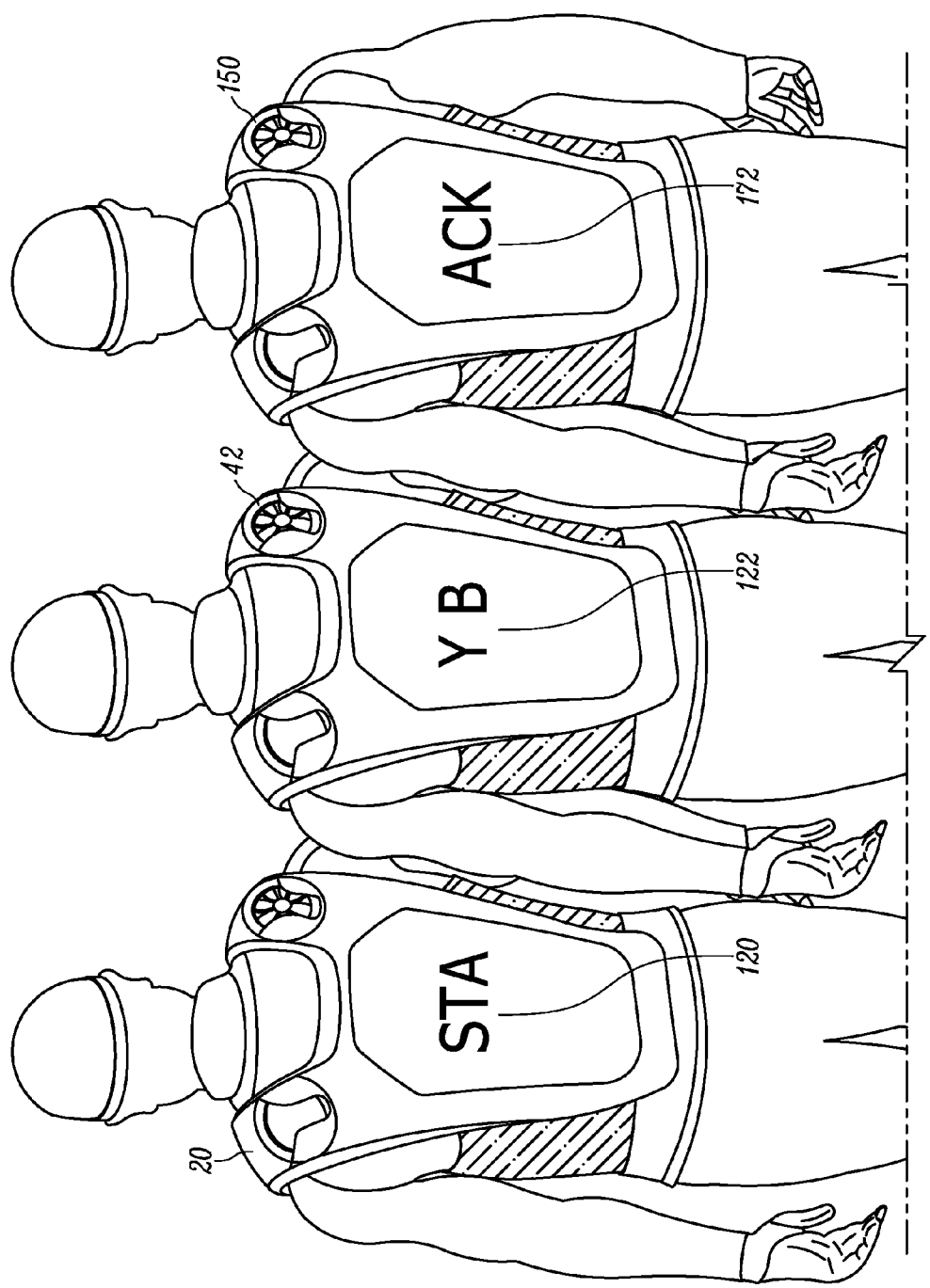
FIG. 14 illustrates dynamically re-apportioning a distributed message via the first electronic display device of FIG. 3A, the second electronic display device of FIG. 3B, and a third electronic display device according to one embodiment.

The message distributer 48 may also dynamically re-apportion the distributed message when a body-worn electronic display device is removed from a display group. Following the above example, if the fourth electronic display device 152 leaves the display group, the message distributer 48 may automatically re-apportion the distributed message based on updated proximity data and updated orientation data. As illustrated in FIG. 14, the message distributer 48 may dynamically re-apportion the distributed message across the first electronic display device 20, the second electronic display device 42, and the third electronic display device 150. In this example, the first electronic display device 20 may display the first message 120 reading "STA", the second electronic display device 42 may display the second message 122 "Y B", and the third electronic display device 150 may display the third message 172 "ACK".

In some embodiments, the message distributer 48 dynamically re-apportions the distributed message as the arrangement of a display group changes. For example, if the first electronic display device 20 in the display group rotates 180°, the message distributer 48 may receive updated first orientation data indicating the 180° rotation of the first electronic display device 20. Based on the updated first orientation data, the message distributer 48 may dynamically re-apportion the portion of the distributed message for display on the first electronic display device 20 (for example, display the portion of the distributed message on a different display of the first electronic display device 20).

Figure 15:
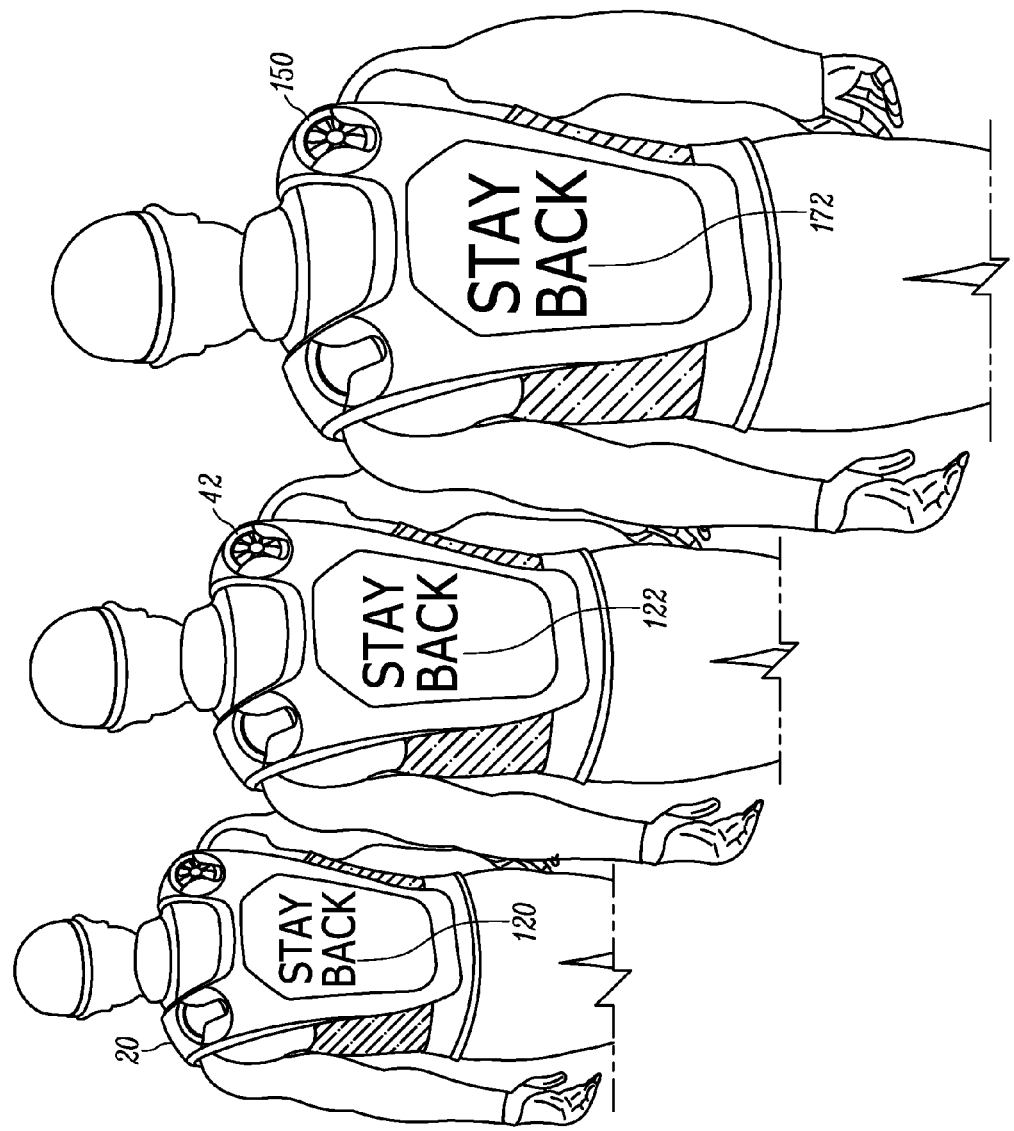
FIG. 15 illustrates displaying a distributed message via the first electronic display device of FIG. 3A, the second electronic display device of FIG. 3B, and the third electronic display device using according to another embodiment.

In some embodiments, the distributed message is apportioned as illustrated in FIG. 15, in which the distributed message is apportioned by displaying the same words (in this example, "STAYBACK") as the first message 120, the second message 122, and the third message 172 across multiple body-worn electronic display devices.

In some embodiments, the central controller 44 is a distributed controller. The distributed controller may include one or more controllers located on each body-worn electronic display device. The one or more controllers may be configured to perform the functionality described herein with respect to the central controller 44. The one or more controllers may each include a message distributer for dynamically apportioning a distributed message across one or more body-worn electronic display devices. For example, the first controller 60 included on the first electronic display device 20 may include a first message distributer and the second controller 80 included on the second electronic display device 42 may include a second message distributer. A distributed architecture facilitates sharing of data. For example, the first electronic display device 20 may receive and transmit proximity data, first orientation data, and second orientation data directly with the second electronic display device 42 via the network 54. Similarly, the second electronic display device 42 may receive and transmit proximity data, first orientation data, and second orientation data directly with the first electronic display device 20 via the network 54.

As mentioned above, the body-worn electronic display devices may include additional components. For example, in some embodiments, the body-worn electronic display devices include an image detector (for example, a camera or an image sensor). The image detector may be configured to detect hand motions of the wearer of a body-worn electronic display device. The detected hand motions may, for example, be used as user input for control of a body-worn electronic display device. Furthermore, the image detector may be configured to capture a video stream from the point of view of the wearer of a body-worn electronic display device. The video stream may be transmitted to a remote location and/or may be displayed via a body-worn electronic display device. In some embodiments, the body-worn electronic display devices include a lighting device, a communication device, an audio device, and the like.

In some embodiments, the additional components of the body-worn electronic display devices are used to detect user inputs (for example, audible commands, gestures, manual inputs, and the like). The user inputs may be converted to display data and used to control the body-worn electronic display devices (e.g., as part of block 101 of FIG. 4). For example, an image sensor of the first electronic display device 20 may detect a "stop" gesture performed by the wearer of the first electronic display device 20. The first controller 60 may convert the detected "stop" gesture to display data (for example, data indicating that the word "STOP" needs to be displayed). Based on the converted display data, the first display 22A and/or the second display 22B may display the word "STOP."

In some embodiments, a body-worn electronic display device is a head-worn electronic display device (for example, a hat, a helmet, and the like), a foot-worn electronic display device (for example, a pair of shoes), a hand-worn electronic display device (for example, a pair of gloves, a pair of mittens, and the like), and other displays may be used. Embodiments may also be implemented with combinations of body-worn display devices including the combination of a head-worn electronic display device and a hand-worn electronic display device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for displaying messages using body-worn electronic display devices, the method comprising:
   receiving proximity data indicating a distance between a first electronic display device and a second electronic display device, the first electronic display device being a body-worn electronic display device associated with a first wearer and the second electronic display device being a body-worn electronic display device associated with a second wearer different from the first wearer;
   receiving first orientation data indicating an orientation of the first electronic display device;
   receiving second orientation data indicating an orientation of the second electronic display device;
   detecting at least one selected from a group consisting of an audible command, a gesture, and a manual input;
   converting, to display data, the at least one selected from the group consisting of an audible command, a gesture, and a manual input that is detected;
   determining a distributed message for display based on the proximity data, the first orientation data, the second orientation data, and the display data, the distributed message including a first message for display on the first electronic display device and a second message for display on the second electronic display device; and
   displaying, by a controller, the first message on the first electronic display device and the second message on the second electronic display device.

2. The method of claim 1, further comprising:
   grouping the first electronic display device and the second electronic display device as part of a display group; and
   apportioning a distributed message for display across the display group, wherein the first message is apportioned from the distributed message before displaying the first message on the first display and wherein the second message is apportioned from the distributed message before displaying the second message on the second display.

3. The method of claim 2, further comprising:
   receiving at least one selected from the group consisting of updated proximity data, updated first orientation data, and updated second orientation data; and
   re-apportioning the distributed message for display across the display group based on the at least one selected from the group consisting of updated proximity data, updated first orientation data, and updated second orientation data.

4. The method of claim 2, wherein grouping the first electronic display device and the second electronic display device is based on the proximity data indicating that the distance between the first electronic display device and the second electronic display device is within a proximity threshold.

5. The method of claim 2, wherein apportioning the distributed message comprises:
   determining an arrangement of the display group, wherein apportioning the distributed message is based on the arrangement.

6. The method of claim 5, wherein apportioning the distributed message comprises:
   determining a number of viewable displays of the display group at a first viewing angle, wherein apportioning the distributed message is based on the number of viewable displays of the display group at the first viewing angle.

7. The method of claim 2, wherein the display group includes additional electronic display devices included within the display group based on additional proximity data.

8. The method of claim 1, wherein displaying the first message on the first electronic display device comprises:
   determining that a first viewing angle of a first display of the first electronic display device is a private viewing angle;
   determining that a second viewing angle of a second display of the first electronic display device is a public viewing angle; and
   displaying the first message at the first display and not at the second display of the first electronic display device.

9. The method of claim 1, further comprising:
   transmitting the first orientation data from the first electronic display device to the second electronic display device; and
   transmitting the second orientation data from the second electronic display device to the first electronic display device.

10. A message display system for displaying messages using body-worn electronic display devices, the system comprising:
    a first electronic display device;
    a second electronic display device; and
    a controller, the controller having
      a memory storing executable instructions, and
      an electronic processor coupled to the memory and configured to execute the executable instructions to
        receive proximity data indicating a distance between the first electronic display device and the second electronic display device, the first electronic display device being a body-worn electronic display device associated with a first wearer and the second electronic display device being a body-worn electronic display device associated with a second wearer different from the first wearer, receive first orientation data indicating an orientation of the first electronic display device, receive second orientation data indicating an orientation of the second electronic display device, detect at least one selected from a group consisting of an audible command, a gesture, and a manual input, convert, to display data, the at least one selected from the group consisting of an audible command, a gesture, and a manual input that is detected, determine a distributed message for display based on the proximity data, the first orientation data, the second orientation data, and the display data, the distributed message including a first message for display on the first electronic display device and a second message for display on the second electronic display device, and display the first message on the first electronic display device and the second message on the second electronic display device.

11. The system of claim 10, wherein the controller is part of the first electronic display device, the first electronic display device further comprising:

a garment wearable on a body, the first display positioned on the garment;

a proximity detector generating the proximity data and coupled to the controller; and an orientation detector generating the orientation data and coupled to the controller.

12. The system of claim 10, wherein the controller is a remote computing device coupled to the first electronic display device and the second electronic display device via a wireless network.

13. The system of claim 10, wherein the controller is a distributed controller, the distributed controller having a first controller on the first electronic display device, and a second controller on the second electronic display device, wherein the display of the first message is controlled by the first controller and the display of the second message is controlled by the second controller.

14. The system of claim 13, wherein the first controller provides the first orientation data to the second controller and wherein the second controller provides the second orientation data to the first controller.

15. The system of claim 13, wherein the first controller determines the first message from the distributed message based on the first orientation data, the second orientation data, and the proximity data, and wherein the second controller determines the second message from the distributed message based on the first orientation data, the second orientation data, and the proximity data.

16. A method for displaying messages using body-worn electronic display devices, the method comprising:

receiving proximity data indicating a distance between a first electronic display device and a second electronic display device, the first electronic display device being a body-worn electronic display device associated with a first wearer and the second electronic display device being a body-worn electronic display device associated with a second wearer different from the first wearer;

receiving first orientation data indicating an orientation of the first electronic display device;

receiving second orientation data indicating an orientation of the second electronic display device;

determining a distributed message for display based on the proximity data, the first orientation data, and the second orientation data, the distributed message including a first message for display on the first electronic display device and a second message for display on the second electronic display device;

determining that a first viewing angle of a first display of the first electronic display device is a private viewing angle;

determining that a second viewing angle of a second display of the first electronic display device is a public viewing angle; and displaying, by a controller, the first message on the first electronic display device and the second message on the second electronic display device, wherein the first message is displayed at the first display and not at the second display of the first electronic display device.

17. The method of claim 16, further comprising:

grouping the first electronic display device and the second electronic display device as part of a display group; and apportioning a distributed message for display across the display group, wherein the first message is apportioned from the distributed message before displaying the first message on the first electronic display device and wherein the second message is apportioned from the distributed message before displaying the second message on the second electronic display device.

* * * * *